United States Patent [19]
Jeffries et al.

[11] Patent Number: 6,035,333
[45] Date of Patent: Mar. 7, 2000

[54] METHOD AND SYSTEM FOR PROVIDING CONGESTION CONTROL IN A DATA COMMUNICATIONS NETWORK

[75] Inventors: Clark Debs Jeffries, Clemson, S.C.; Anoop Ghanwani, Durham, N.C.; Gerald Arnold Marin, Chapel Hill, N.C.; Ken Van Vu, Cary, N.C.

[73] Assignee: International Business Machines Corporation, Armonk, N.Y.

[21] Appl. No.: 08/977,252

[22] Filed: Nov. 24, 1997

[51] Int. Cl.⁷ .................................................. G06F 15/173
[52] U.S. Cl. .......................... 709/224; 709/223; 709/235; 370/445
[58] Field of Search ..................................... 709/253, 200, 709/250, 235, 223, 224; 370/448, 445, 446

[56] References Cited

U.S. PATENT DOCUMENTS

| | | | |
|---|---|---|---|
| 5,650,997 | 7/1997 | Yang et al. | 370/448 |
| 5,852,723 | 12/1998 | Kalkunte et al. | 709/235 |
| 5,905,870 | 5/1999 | Mangin et al. | 709/234 |
| 5,936,962 | 8/1999 | Haddock et al. | 370/446 |
| 5,940,399 | 8/1999 | Weizman | 370/445 |

FOREIGN PATENT DOCUMENTS

0632620 A2  6/1994  European Pat. Off. ........ H04L 12/40

98/07257A1  8/1996  WIPO ........................ H04L 12/413

OTHER PUBLICATIONS

Ren, et al. Flow Control and Congestion Avoidance in Switched Ethernet LANs, IEEE, pp. 508–512, Jun. 1997.

*Primary Examiner*—Zarni Maung
*Assistant Examiner*—William Titcomb
*Attorney, Agent, or Firm*—Gerald R. Woods

[57] ABSTRACT

A bin packing algorithm is employed to schedule computer network activities, such as pause times required for operation of an Ethernet network which implements existing IEEE 802.3x standards. In such a network, any node in the network can control the flow of traffic from upstream stations in order to avoid congestion at the flow-controlling node. Upon sensing congestion, the flow-controlling node determines how long each upstream node contributing to the congestion should pause transmission over the next control interval. In accordance with the invention, the pause times are scheduled or staggered by using the bin packing algorithm to sort the sources into one or more bins. One required bin property is that there is no overlap in pause times for the sources within a particular bin. Another required bin property is that the sum of the pause times within a bin can be no greater than the length of the control interval. In a preferred embodiment, the calculated pause times are separated into different groups having different number ranges and no more than one pause time is selected from any particular group for packing into a given bin.

5 Claims, 6 Drawing Sheets

METHOD AND SYSTEM FOR PROVIDING CONGESTION CONTROL IN A DATA COMMUNICATIONS NETWORK

FIELD OF THE INVENTION

The present invention relates to data communications networks and more particularly to a method and system for providing congestion control in such a network.

BACKGROUND OF THE INVENTION

When data processing systems first were used commercially on a widespread basis, the standard system configuration was an autonomous mainframe or host computer which could be accessed only through locally-attached terminals. Few people, at that time, perceived any significant benefit from interconnecting host computers.

Over time, it came to be understood that significant commercial advantages could be gained by interconnecting or networking host computers. Data originating with users at one host computer could readily and rapidly shared with users located at other host computers, even where those other host computers were many miles away. Also, the functional capabilities of a given host computer could be treated as a resource that could be shared not only among locally-attached users but also among remote, network-attached users. Mainframe networks of this type came to be generically referred to as Wide Area Networks, commonly abbreviated to WANs.

Certain parallels exist between the development of mainframe computer technology and the later development of personal computer technology. Early personal computers were relatively unsophisticated devices intended for use by a single user in a standalone configuration. Eventually, the same kinds of needs (data sharing and resource sharing) that drove the development of mainframe networks began to drive the development of networks of personal computers and auxiliary devices, such as printers and data storage devices. While mainframe networks developed primarily using point-to-point connections among widely-separated mainframes, personal computer networks developed using shared or common transmission media to interconnect personal computers and auxiliary devices within a geographically-limited area, such as a building or even an area within a building. Networks of this type came to be generically referred to as Local Area Networks or LANs.

Different LAN technologies exist. Currently, the most popular LAN technology is Ethernet technology. In an Ethernet LAN, personal computers and auxiliary devices share a common bi-directional data bus. In the following description, LAN-attached devices will be generically referred to as stations or LAN stations. Any transmission-capable LAN station may initiate transmission on the bus and every transmission propagates in both directions and is received by every LAN station attached to the same bus, including the transmitting station.

Because several LAN stations can attempt to claim the bus at the same time, a Collision Sense Multiple Access/Carrier Detect (CSMA/CD) protocol exists to resolve conflicts among contending users. The protocol is relatively simple. When a station has data to transmit, it "listens" to the bus to see if the bus is already carrying data from another station. If the bus is found not to be in use, the listening station begins its own transmission immediately. If the bus is found to be in use, the station with data to send waits for a predetermined interval before restarting the bus acquisition process.

Since electrical signals require time to propagate down any conductor, two or more stations can listen, find the bus quiet at the time, and begin transmitting simultaneously. If that happens, data from the transmitting stations collide and becomes corrupted. If a transmitting station doesn't detect the same data it transmitted, that station sends a short jamming signal and stops transmitting. The jamming signal increases the chances that all other transmitting stations will detect the collision and stop transmitting themselves. Following a random delay, each transmitting station restarts the bus acquisition process.

The same user needs (data sharing and resource sharing) which drove the development of Ethernet LANS have driven the creation of Ethernet networks consisting of multiple Ethernet LANs interconnected through boundary devices known as LAN bridges or switches. Point-to-point connections or links between LAN switches permit traffic originating in any given Ethernet LAN to be transported to a LAN station connected to any other LAN in the same switched Ethernet network. A given switch-to-switch link typically carries traffic from multiple sources concurrently. Although Ethernet was originally developed as a shared-media LAN technology, "switched" Ethernet technology is being developed to support full duplex links.

The CSMA/CD protocol, while providing a fairly effective flow control mechanism within a single shared Ethernet LAN, is ineffective in controlling flow (preventing congestion) on switched links. To provide flow control on switch-to-switch links, at least one standards group, the IEEE 802.3 working group, has developed a flow control standard (IEEE 802.3x) for such links. Under the standard (as currently developed), a station that wants to inhibit transmission of data from one or more upstream stations on the network generates a pause frame which contains, among other things, a pause time and a reserved multicast address. Pause times are expressed as a number of time slots, with a time slot being the time required to transmit a sixty-four byte packet on the link. While IEEE 802.3x flow control was designed primarily to overcome the lack of flow control on full duplex Ethernet links, it can also be used on shared segments.

A link-controlling station, such as a bridge, can respond to the reserved multicast address to pause traffic on the entire link for the specified pause time. In theory only, it is possible to send a pause frame with a destination address which identifies a specific LAN station instead of a link-controlling station. In current practice, it is a violation of the standard to generate a pause frame having anything other than a reserved multicast address as the destination address.

A general problem with the approach currently defined in the standard is that flow control is performed on a link level rather than on a per-station level. As a consequence, a flow control initiated to deal with a congested path may end up interfering with flow along uncongested paths as well.

Extending the standard to permit flow control signals to be addressed to individual stations solves some, but not all, problems. The length of time between successive pause frames can be defined as a control interval. If a flow-controlling station generates pause frames requiring that n different traffic sources pause at the beginning of a control interval, then all of the traffic sources will pause at substantially the same time, reducing the number of active connections on a controlled link by n. However, as the traffic sources complete their individual pause times, multiple sources may resume sending at substantially the same time. As a consequence of this unintended "synchronization" of traffic actions at individual sources, the traffic rate at the flow-controlling station may oscillate between too little traffic (at the onset of source pause times) and too much traffic (as pause times for multiple stations are completed at or about the same time).

SUMMARY OF THE INVENTION

The present invention solves the above-discussed problem by distributing pause times over the control interval. The invention can be implemented as a method performed at any station responsible for controlling the flow of traffic on a link between switching devices in a data communication network. Traffic at the station is monitored to detect the onset of congestion. When congestion is detected, traffic sources contributing to the congestion are identified in a defined set. A pause time is established for each of the sources included in the set. Then the start of the established pause time for each source in the set is scheduled using an algorithm which attempts to spread the pause times over the duration of the control interval. The number of stations paused at any given time is minimized while continuing to satisfy the requirement that each station be silent for its assigned pause time during the control interval.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 6, consisting of FIGS. 6A and 6B taken together, is a flow chart of the inventive process for scheduling pause times to provide effective utilization of available bandwidth;

DETAILED DESCRIPTION

Figure 1:
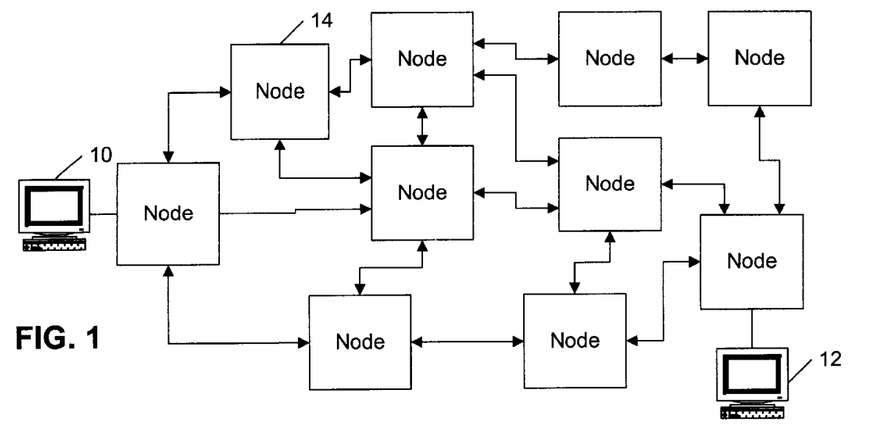
FIG. 1 is an illustration of a mesh-connected network in which the present invention is implemented.

FIG. 1 is a generic representation of a data communication network which supports communications between remote users, represented by stations 10 and 12. In such a network, data originating at one of the stations reaches the other after traversing an intervening network generically represented as a number of mesh-connected data systems or nodes, typified by node 14. The configuration and functionality of the nodes will vary as a function of the networking protocols implemented in the network. For purposes of the present invention, a node which implements the present invention must be capable of handling traffic from multiple sources concurrently and of routing or switching traffic from any of a set of input links to any of a set of output links.

Figure 2:
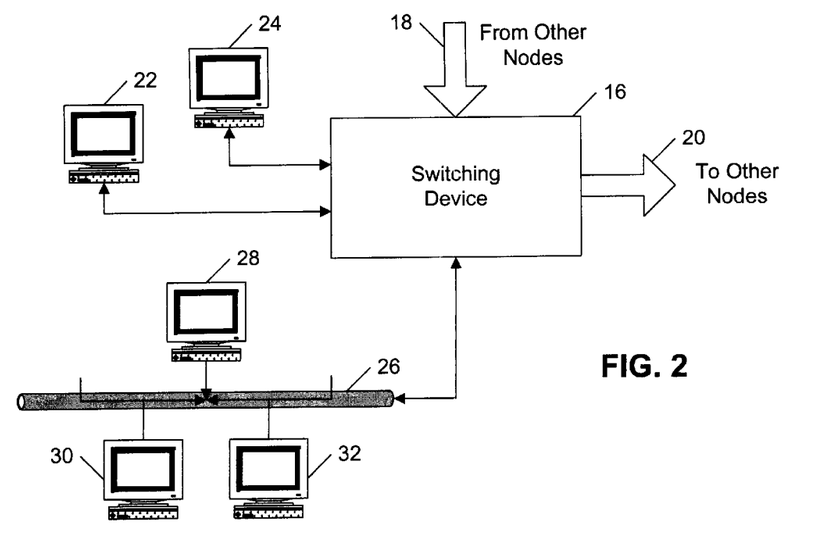
FIG. 2 is a more detailed representation of a typical switching point in the illustrated network.

Referring to FIG. 2, a node is not necessarily simply a pass-through device connecting other nodes. A switching device 16 must, of course, be capable of receiving data traffic from other nodes over a set of input links, represented collectively by arrow 18, and of routing or switching that data traffic to an output links selected from a set of output links, represented collectively by arrow 20. Typically, a switching device in a node must also be able to handle locally-originated data traffic, such as might be provided by workstations 22 and 24 attached directly to switching device 16 or by a local area network 26. From the perspective of stations on the local area network 26, such as workstations 28, 30 and 32, the switching device 16 takes on the appearance of another LAN station.

Figure 3:
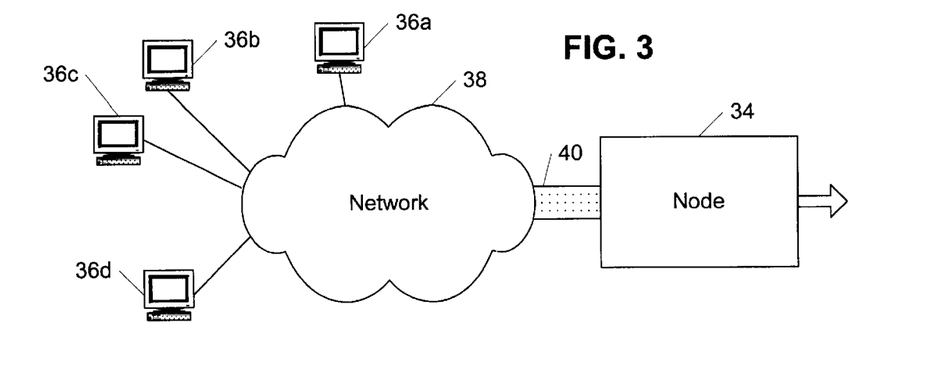
FIG. 3 illustrates the general environment for the present invention.

Referring to FIG. 3, a node 34 which performs data routing/switching necessarily acts as a concentrator for data traffic originating at multiple, independent traffic sources (represented by stations 36a, 36b, 36c and 36d) which provide the traffic to the node over connections made through an intervening network, represented only as a network cloud 38, and a set of input links 40 to the node 34. Because the traffic sources are independent of one another, the possibility exists that the sources will, at some point during their normal operation, try to supply more traffic than the node can handle without incurring unacceptable delays or losses. A node which is receiving more traffic than it can cope with in an acceptable manner is said to be in a congested condition. The present invention reduces the chances that a node will be driven into a congested condition by controlling the flow of traffic from those upstream stations that are the source of the congestion.

Figure 4:
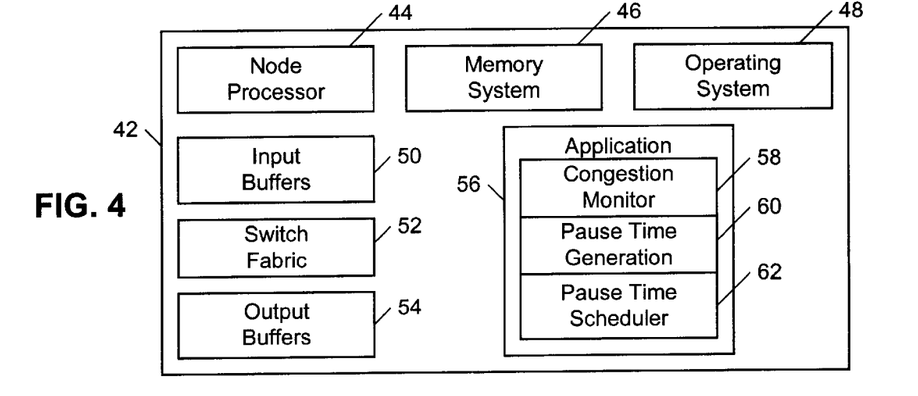
FIG. 4 illustrates the major functional components of a node in which the present invention is implemented.

In a network conforming to the IEEE 802.3x proposed standard, traffic management can be performed in the kind of node 42 shown in block diagram form in FIG. 4. Such a node can be characterized as a specialized form of data processing system. Like any data processing system, the node 42 includes a node processor 44, a memory system 46 and an operating system 48. To support routing and switching operations, node 42 also includes a set of input buffers 50 for temporarily storing data arriving over different connections on the input links, a switch fabric 52, and a set of output buffers for temporarily storing switched data traffic until it can be transmitted onto output links from the node.

In a preferred embodiment, the invention is implemented as a process performed by a computer application program 56 executing in the node. The program 56 includes a congestion monitor component 58, a pause time generator 60 and a pause time scheduler 62. The congestion monitor 58 may use any suitable technique to provide an indication of congestion at the node. One commonly employed technique to monitor the occupancy rate of the output buffers 54. A threshold occupancy level is defined. As long as the occupancy level of a buffer remains below this threshold, the connection is considered to be congestion-free and no flow control actions are performed. If, however, the buffer becomes loaded beyond the threshold occupancy level, the connection is considered to be congested and flow control operations may be initiated.

Figure 5:
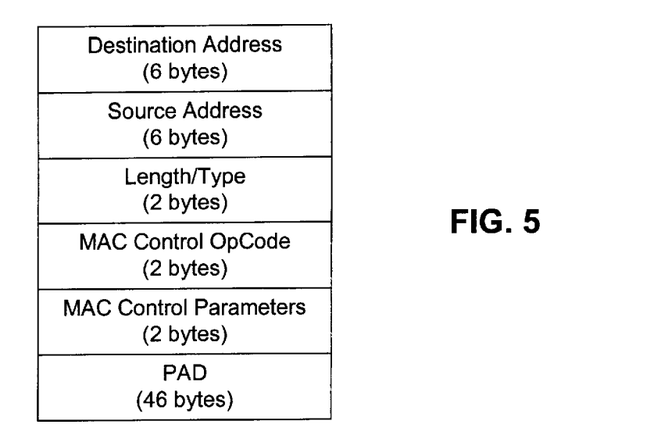
FIG. 5 shows the structure of a pause control frame.

As noted earlier, a network conforming to IEEE 802.3x requirements performs flow control by calculating pause times for upstream traffic sources. The general format of an IEEE 802.3x pause control frame is shown in FIG. 5. The frame includes a six byte Destination Address field which may contain either a reserved multicast address or the address of a particular upstream station. An upstream node recognizing the reserved multicast address will provide flow control at a link level. An upstream node recognizing the address of a particular upstream station within its domain will provide flow control at a station level.

The pause control frame further includes a six byte Source Address field which identifies the downstream station performing the flow control operations, a two byte Length/Type field which is encoded with a value which identifies the frame as a control frame, a two byte MAC Control OpCode field which is encoded to identify the frame as a PAUSE frame, and a two byte MAC Control Parameters field which specifies the pause time for the affected station or link. To bring the frame into conformance with Ethernet protocols implemented in an IEEE 802.3x system, the frame is padded with sufficient non-data characters to increase the frame length to the minimum length of sixty-four bytes required for Ethernet frames.

The premise underlying the present invention is that even where multiple upstream stations must be directed to remain silent for specified pause times during a predetermined control interval, it is advantageous to schedule or stagger those pause times within the control interval in a way which minimizes the number of stations that are paused or silent at any given time while continuing to satisfy the requirement that each station remain silent for at least its scheduled pause time during the control interval. The scheduling of pause times is performed using an algorithm known generally as a bin packing algorithm which is executed at the beginning of each control interval. The initial data for the calculations consists of a set of pause times generated for upstream nodes based on detection of congested connections at the flow controlling node. The details of the congestion detection or pause times calculations are not necessary for an understanding of the present invention, which deals with the scheduling of the pause times, no matter how generated.

To illustrate a preferred form of the bin packing algorithm, the following set of arbitrarily generated pause times is assumed to exist at the beginning of a control interval having a duration of fifteen time slots:

8,4,3,1,11,7,2,1,9,5,3,6,2,3,5,4 and 5.

To simplify the explanation, the number of pause times in this set and the duration of the control interval are kept low. In practice the number of pause times and the duration of the control interval might be considerably larger than the numbers to be used here for illustration, depending on the size of the network being controlled.

If the duration of the control interval is fifteen time slots, the acceptable range of pause times is from one to fifteen time slots. Decimal pause time values in this range can be expressed as four bit binary words. In accordance with the invention, each pause time within the specified range is assigned to one of four different number groups as set forth in the following table, depending entirely on the most significant bit position in the word having a binary "1" value.

TABLE 1

| Decimal Range | Group |
| --- | --- |
| 8–15 | 1 |
| 4–7 | 2 |
| 2–3 | 3 |
| 0–1 | 4 |

Using the criteria set forth above, the set of pause times is regrouped as indicated in the following table. Note that the pause times are not necessarily reordered in descending value since the grouping is not based on decimal values but rather on most significant bit position containing a binary "1" value.

TABLE 2

| Decimal Form | Binary Form | Group |
| --- | --- | --- |
| 8 | 1000 | 1 |
| 11 | 1011 | 1 |
| 9 | 1001 | 1 |
| 4 | 0100 | 2 |
| 7 | 0111 | 2 |
| 5 | 0101 | 2 |
| 6 | 0110 | 2 |
| 5 | 0101 | 2 |
| 4 | 0100 | 2 |
| 5 | 0101 | 2 |
| 3 | 0011 | 3 |
| 3 | 0011 | 3 |
| 2 | 0010 | 3 |
| 3 | 0011 | 3 |
| 2 | 0010 | 3 |
| 1 | 0001 | 4 |
| 1 | 0001 | 4 |

Figure 6A:
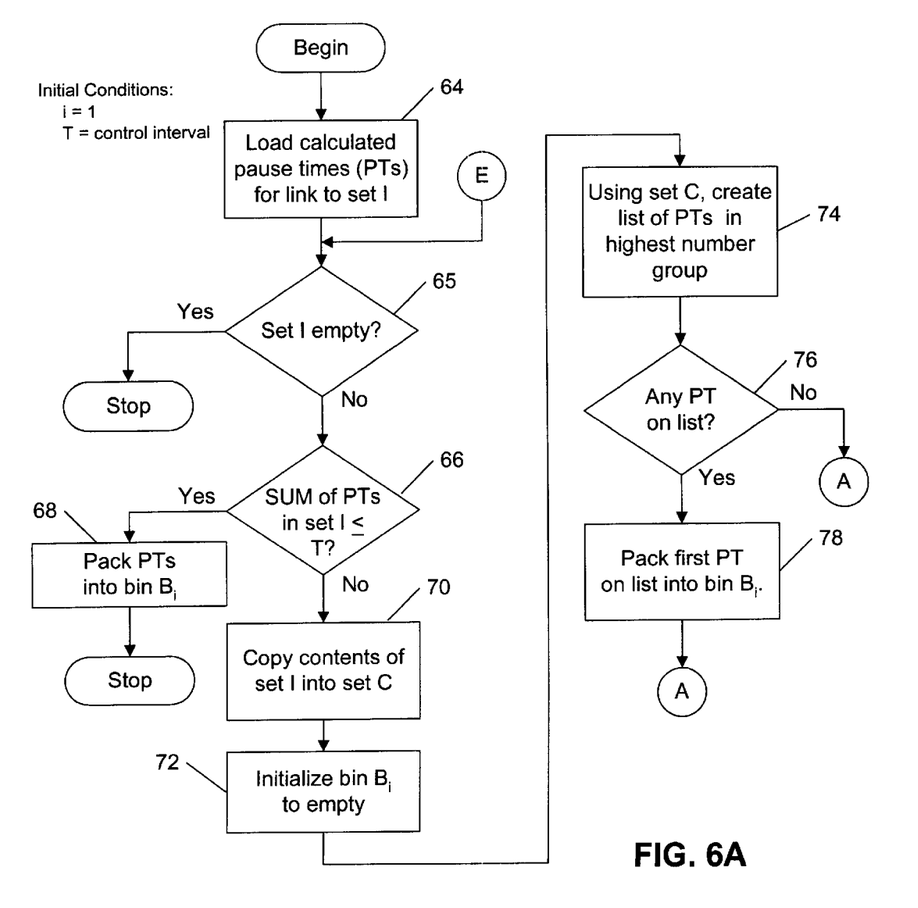
Figure 6B:
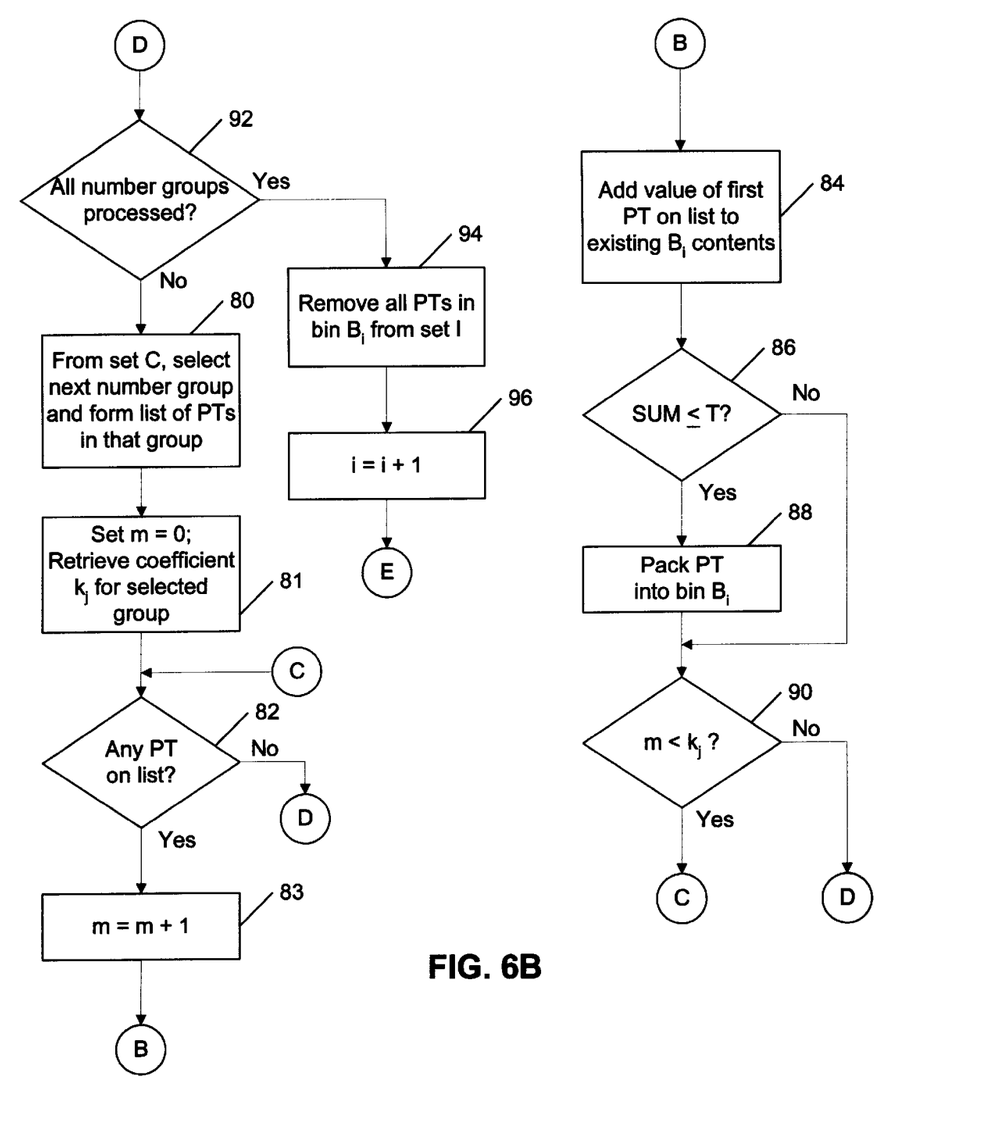

The flow chart in FIG. 6 defines a preferred embodiment of a process for scheduling pause times in order to minimize the number of stations that are silent at any given time during the control interval. The objective of the process is to distribute the pause times into different bins $B_i$, where i is assigned during the packing process. In a preferred embodiment, a group coefficient $k_j$, an integer value, can be assigned to each of the four number groups into which the pause times have been divided. A group coefficient determines the maximum number of pause times that can be selected from any particular number group during a single iteration of the process.

An initial step 64 in the process calls for any previously-calculated pause times to be loaded into a set I at the beginning of each control interval. While, for purposes of illustration, the existence of a set of previously-calculated pause times is being assumed, such pause times exist only where congestion conditions are encountered. To determine whether congestion control actions are even necessary, a threshold determination 65 is made whether set I is empty. If set I is empty, congestion control actions are not required and the process ends. Assuming, however, that set I contains one or more pause time values, the process continues with a test 66, which determines whether the sum of all the pause times in set I is less than the length T of the control interval. If the results of test 66 are positive, all of the pause times are packed into a single bin in step 68 and the process ends.

For the assumed set of pause times, however, the combined sum far exceeds the assumed control interval of fifteen time slots and the process continues to step 70 where the contents of set I are copied into a working set C. A bin $B_i$, initially $B_1$, is initialized to empty in step 72 and the pause times in the highest-valued number group are grouped into a first list in an operation 74. Since there is no guarantee that there will be any pause times at all in the highest-valued number group, a test 76 must be performed even on the first iteration of the process to determine whether the first list is really empty.

If there is at least one pause time in the first list, that pause time is packed into bin $B_1$ in an operation 78. By definition, the maximum pause time value cannot exceed the length of the control interval T, meaning that at least one pause time from the highest-valued group of pause times will fit into an empty bin.

After a pause time from the highest-valued group is packed into bin B or it is found that the highest-valued group list is really empty, the next number group is selected (step 80) and a list is generated of any pause times in working set C falling within that number group. At this point, a variable m is initialized to zero in an operation 81. The variable m is employed in a counting routine which controls the maximum number of attempts that will be made to select a number from a particular number group during the process of packing each bin. In the same operation, the coefficient $k_j$ previously assigned to the group is retrieved for use in the same counting routine. As will be clearer from the description below, each number group will be considered a maximum of $k_j$ times during the packing of each bin.

Since the possibility exists that there may be no pause times that meet the criteria for a particular number group, a test 82 is needed to determine whether the list is empty. Assuming the list includes at least one pause time, the variable m is incremented by one and the value of the first pause time on the list is combined in an operation 84 with the value of any pause times previously packed into the current. The resulting sum is tested against the length of the control interval T in an operation 86. If the sum obtained in step 86 is greater than T, the selected pause time remains in working set C. If, however, the sum is less than or equal to T, the selected pause time is packed into the bin in an operation 88.

A check 90 is then made to determine whether the variable m, incremented previously in step 83, is less than the group coefficient $k_j$ for the selected number group. If m is less than $k_j$, the process loops back to step 82 at which a determination is made whether any pause time values remain on the list under consideration. Steps 82, 83, 84, 86, 88 and 90 define a program loop which repeats either until the current list is found to be empty in step 82 or until m has been incremented into equality with $k_j$ for the number group being processed. Thus, if $k_j=3$, the loop could be repeated up to three times, being "broken" earlier only if the current list is found to be empty in step 82.

When either of the specified exit conditions is found, the process loops to a test 92 which determines whether all of the number groups have been processed. Assuming a negative result to test 92, the process moves on to the next lower-valued number group.

The described steps are repeated for the pause times falling in each succeeding number group until the test 92 indicates that every group has been processed. At this point, the bin is as packed as it is going to get using the indicated process. All pause times packed into the current bin $B_i$ are removed from set I in an operation 94 and a new (empty) bin is selected by incrementing i in an operation 94. The entire process is re-started at operation 65, which determines whether any pause times remain in set I.

Since the size of set I is reduced as each successive bin is packed during iterations of the process, the set I will eventually either be empty (as indicated by a positive result to test 65) or become small enough to allow all remaining pause times to be packed into a single bin without going through a group-by-group process. The process is halted once any remaining pause times are transferred to the bin in operation 68.

Figure 7:
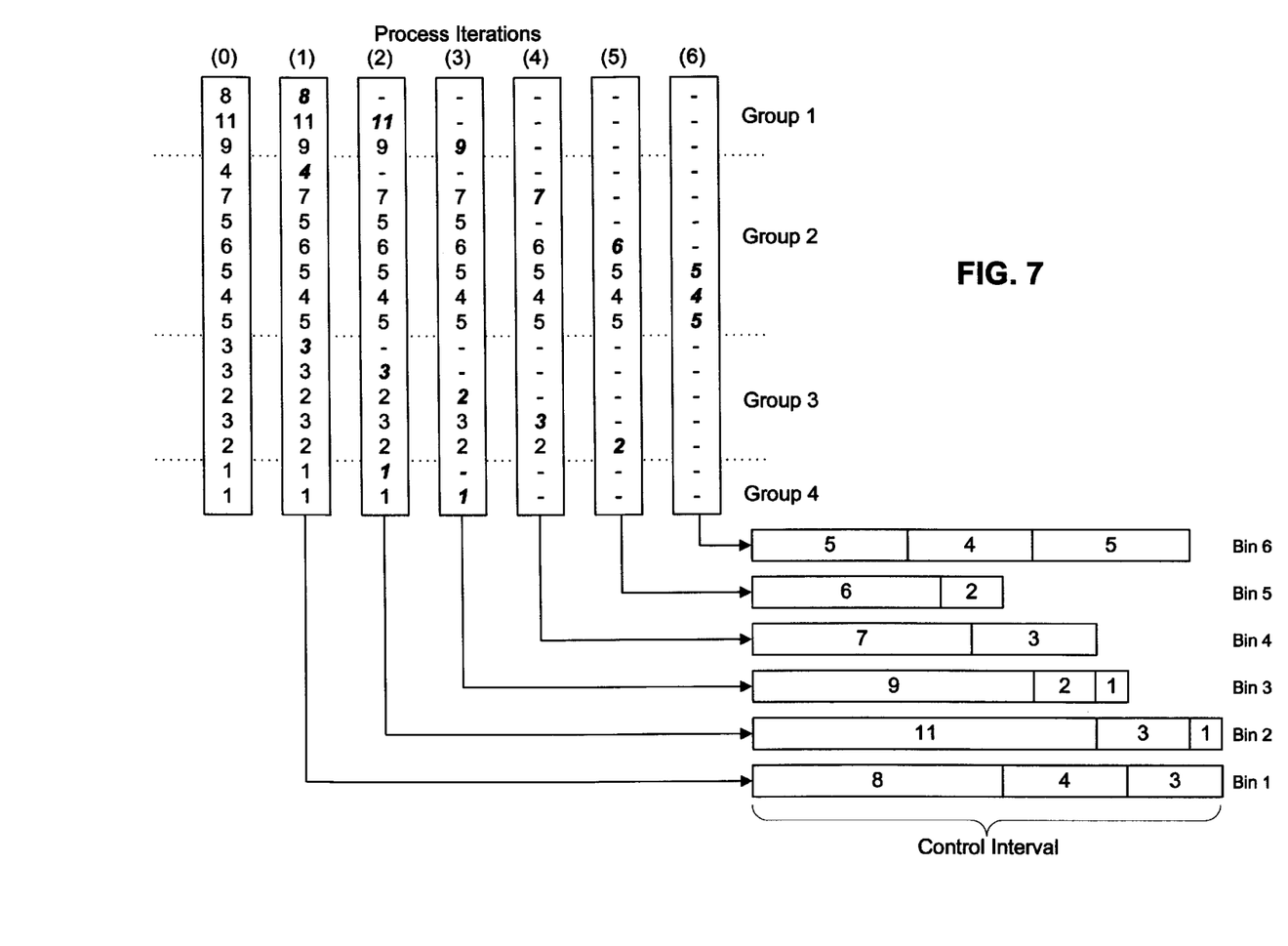
FIG. 7 is a representation of the packing of pause times as a result of several iterations of the process described with reference to FIG. 6.

FIG. 7 is a representation of the "movement" of pause times from the working set C into successive bins during successive iterations of the process previously described with reference to FIG. 7. The vertical columns under the Iterations heading shows the contents of the working set at each iteration of the process with the bolded italicized numbers representing the pause times that are transferred to the current bin during each iteration. For example, in the first iteration of the process, the pause times identified by the bolded, italicized numbers 8, 4, and 3 are moved from the working set into Bin 1. Any pause time which is moved into a bin during a process iteration is removed from the working set, causing the working set to shrink with each iteration. This shrinkage is illustrated by the dashes which appear to the right of any pause time which was moved into a bin during a prior iteration of the process.

It may be desirable to assign a unitary group coefficient to each of the number groups. The advantage of doing this is computational simplicity. The number of process iterations is limited to the number of number groups. The possible disadvantage of setting all group coefficients to one is that only the first pause time from each group will be considered during each process iteration. Even if the first pause time cannot be packed into the current bin (because it would cause a bin overflow), no consideration will be given during the current process to using other possibly-smaller pause times falling within the same number group. As a result, some bins not be optimally packed. For example, Bins 4 and 5 are packed with only ten and eight time slots, respectively, for the assumed pause time set and group coefficients limited to one.

Assuming non-unitary group coefficients are to be used, a preferred coefficient value for a particular number group can be obtained in a number of ways. Since most data communication networks exhibit the same general traffic patterns over extended periods of time, the preferred coefficient for each number group may be obtained simply by viewing the pause time statistics over an extended period and then assigning a "permanent" coefficient to each of the groups. While this approach has the advantage of simplicity, it clearly does not take into account dynamic changes in network traffic patterns. Depending on how significant changes are expected to be, it may be desirable to perform a histographic or other statistical analysis of network behavior on a real-time or near real-time basis and to assign group coefficients based on the most recent available results of such analysis.

Depending on the values of the pause times in any particular working set, it may also be mathematically possible to pack bins more fully by using a "best fit" bin packing algorithm. While the use of such an algorithm is within the scope of the invention, such algorithms may not always be a preferred choice since any improvement in bin packing efficiency may be outweighed by the added complexity of the required calculations.

The detailed discussion of the bin packing process, while necessary for an understanding of the present invention, does not lend itself to a clear understanding of how that process actually affects network operations. Recall that each pause time is associated with an upstream station that is contributing data traffic to a congested condition at the node implementing the process. The objective of the congestion control process is to generate information that is needed to inform each such upstream station not only how long it must pause during the next control interval but also when that pause time is to begin within the control interval.

Figure 8:
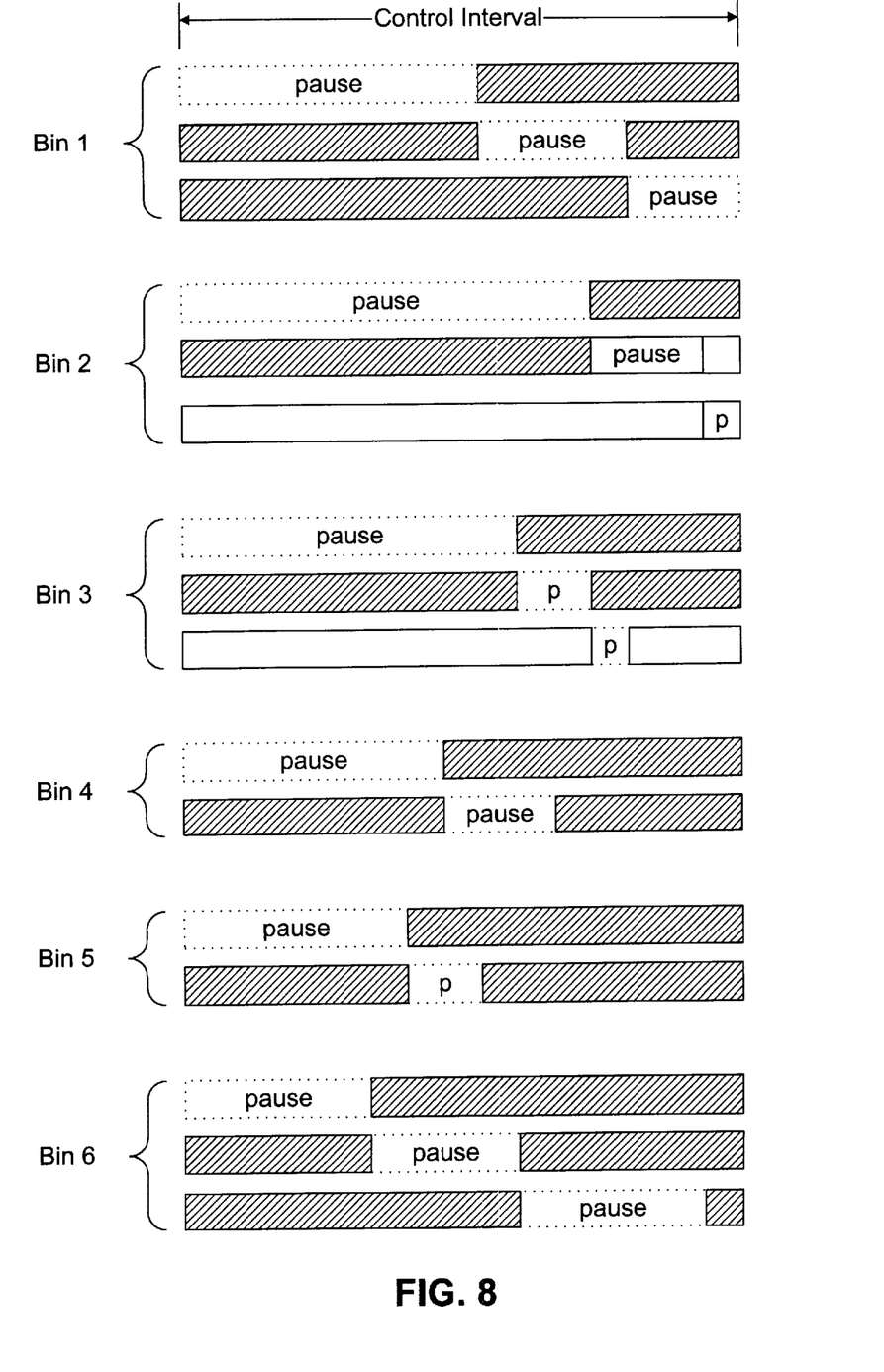
FIG. 8 is a chart of scheduled transmission and pause times for each of the traffic sources in the assumed set.

FIG. 8 represents the intended responses of the upstream stations to pause control messages resulting from the process. Each horizontal bar represents a single station with its pause time represented by an unshaded area and its transmission time(s) represented by cross-hatched bar(s). By definition, any source that is not paused is expected to be transmitting, which means that any given station may have a transmit-pause-transmit sequence during the control interval. It should be noted that the pause time for a station within a particular bin does not overlap the pause time for any other station within the same bin. This figure illustrates the intended effect of the process; namely, the distribution of the pause times over the length of the control interval so that all pause time obligations are satisfied while minimizing the number of traffic sources that must remain silent or paused at any given time.

While there have been described what are considered to be preferred embodiments of the present invention, variations and modifications therein will occur to those skilled in the art. For example, while the invention has been presented in the context of scheduling pause times in order to avoid congestion at a particular node in a network, the invention can be applied to any system in which multiple systems must undertake some sort of data processing activity within a known control interval. Through the use of the invention, the start and the duration of the activity at each of the systems can be controlled. It is intended that the appended claims shall be construed to include the preferred embodiments and all such variations and modifications that fall within the true spirit and scope of the present invention.

What is claimed is:

1. In a data communication network having a plurality of data traffic sources interconnected by transmission links, a method of controlling the flow of data traffic from said sources to a particular node over a predetermined control interval, said method comprising the steps of:
    a) determining a desired transmission pattern for each data traffic source during the control interval;
    b) establishing one or more bins, each bin including entries for one or more traffic sources, grouping the data transmission sources into different, non-overlapping groups as a function of the pause times in the traffic patterns, moving no more than one source from a particular group into a bin, said entries being selected so that no more than one traffic source included in the bin will be paused at any given time during the control interval and the sum of the pause times in the bin is no greater than the length of the control interval; and
    c) generating a transmission control message for each of the data traffic sources to cause said sources to transmit or pause transmission during the control interval as a function of information contained in the transmission control message.

2. In a data communication network having a plurality of data traffic sources, a plurality of switching devices for switching data traffic provided by said sources, and a plurality of links interconnecting said switching devices, a method of controlling the flow of data traffic on a link, said method comprising the steps of:
    a) monitoring the data traffic on the link to detect the onset of a congestion condition;
    b) defining a set consisting of traffic sources which should be paused within a control interval to avoid congestion;
    c) establishing the length of a pause time for each of the traffic sources in the defined set within a predetermined control interval by grouping the data transmission sources into different, non-overlapping groups as a function of the pause times in the traffic patterns, moving no more than one source from a particular group into a bin; and
    d) scheduling the initialization of the established pause time for each traffic source in the defined set to minimize the number of traffic sources in the set that are paused at any given time within the control interval.

3. In a data communication network having a plurality of systems capable of independently performing data process-ing tasks, each of said tasks requiring a known execution time, a method of scheduling the start of tasks at each of said systems so as to enable the execution of all of said tasks within a predetermined control interval, said method being performed at a scheduling system connected to the systems at which the tasks are to be performed ans compromising the steps of:
    a) creating a number set consisting of the times required for execution of a set of tasks within the next control interval;
    b) assigning each task execution time in said number set into one of two or more non-overlapping number groups, each of said number groups including all task execution times having numeric values within a predetermined range of numbers;
    c) executing a bin packing algorithm to assign said task execution times to a number of bins, each of said bins including no more than one task execution time from each of said number groups by
        i) determining whether the sum of the task execution times for all of the tasks exceeds the length of the control interval;
        ii) if the sum is less than or equal to the length of the control interval, assigning all of said task execution times to a single bin and proceeding to the step of generating start messages;
        iii) if the sum is greater than the length of the control interval, creating a packed bin by initializing a new empty bin, and moving a task execution time from each number group into the bin if the sum of the bin contents following the move will be less than or equal to the length of the control interval;
        iv) repeating step iii) until all of the task execution times have been moved into a bin, and proceeding to the step of generating start messages;
    d) generating start messages for said systems, each message including a time at which a system is to start execution of the task to be performed, the time being a function of the relative location of the task execution time for the system within its assigned bin; and
    e) distributing the start messages to said systems.

4. For use in a network having a plurality of data processing systems, a scheduling apparatus for scheduling activities at said data processing systems over the duration of a control interval having a known length, said apparatus comprising:
    a) means for determining the length of an appropriate activity period for each of the data processing systems;
    b) means for packing the activity periods for said data processing systems into one or more bins by grouping the data transmission sources into different, non-overlapping groups as a function of the pause times in the traffic patterns, moving no more than one source from a particular group into a bin so that the no overlap exists between any two activity periods within the same bin and the combined length of activity periods within a bin is no greater than the duration of the control interval; and
    c) means for distributing activity control messages from the scheduling apparatus to each of the data processing systems.

5. For use in a data communication network having a plurality of data sources and a plurality of devices for routing data traffic among the sources, a flow control apparatus located at one of the routing device comprising:

a) a congestion monitor for detecting the onset of traffic congestion at a predetermined location in the network;

b) a source identifier for identifying those data traffic sources contributing to the congestion and for including those sources in a set;

c) a pause time calculator for determining an appropriate pause time for each of the sources in the set;

d) a bin packing component for assigning the sources in the set to different bins, each bin having non-overlapping pause times by moving no more than one source from a particular group into a bin and the sum of the pause times being no greater than the length of the control interval; and e) a scheduling element for generating source-controlling messages, each message specifying the start and the duration of the pause time for the particular source identified in the message.

* * * * *